(12) United States Patent
Dunlap

(10) Patent No.: US 6,396,399 B1
(45) Date of Patent: May 28, 2002

(54) REDUCTION OF DEVICES TO QUIET OPERATION

(75) Inventor: Douglas G Dunlap, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/799,180

(22) Filed: Mar. 5, 2001

(51) Int. Cl.[7] ............................................... G08B 21/00
(52) U.S. Cl. ............. 340/540; 340/825.44; 340/825.46; 340/825.48; 340/539; 455/67.1; 455/425; 455/567
(58) Field of Search ............................ 340/540, 825.44, 340/825.46, 825.48, 539; 455/425, 567, 67.1

(56) References Cited

U.S. PATENT DOCUMENTS

| | | | | |
|---|---|---|---|---|
| 5,828,312 A | * | 10/1998 | Yamazaki | 340/825.46 |
| 5,870,029 A | * | 2/1999 | Otto et al. | 340/825.36 |
| 5,940,764 A | * | 8/1999 | Mikami | 455/456 |
| 6,011,973 A | * | 1/2000 | Valentine et al. | 455/456 |

* cited by examiner

*Primary Examiner*—Jeffery Hofsass
*Assistant Examiner*—Hung Nguyen

(57) ABSTRACT

An object alerting device discovers nearby alerting devices, compares the nearby alerting devices to a condition, and sets the object alerting device to a quiet mode when the condition is met by the nearby alerting devices. The nearby alerting devices may be discovered by receiving identification information from the nearby alerting devices and analyzing the identification information to discover the nearby alerting devices. Additionally, the object alerting device may first broadcasting a request for identification to the nearby alerting devices. The object alerting discovers the nearby alerting devices within a range, such as the communication range of the object alerting device, a portion of the communication range of the object alerting device, or a fixed distance about the object alerting device. The condition may be a number of nearby alerting devices within a distance from the object alerting device. The object alerting device may set be set to a quiet mode by either reducing the alerting volume, enabling a vibration alert mode, or both reducing the alerting volume and enabling a vibration alert mode.

20 Claims, 3 Drawing Sheets

REDUCTION OF DEVICES TO QUIET OPERATION

FIELD OF THE INVENTION

This invention relates in general to quieting devices and, more particularly, to automatically quieting alerts on devices in close proximity to one another.

BACKGROUND OF THE INVENTION

Pagers and cellular telephones are ever-present throughout our culture. Business meetings, theaters and other gathering places are often filled with these devices. Each of these devices has an alerting mechanism for alerting the user to incoming messages or calls. Often the alerting mechanisms on these devices interrupt meetings by loudly announcing the incoming messages or calls.

In order to avert this sort of disruption, many pager and cellular telephone manufacturers have provided these devices with optional low or off volume settings. These devices also often have a vibration alert setting that is a virtually inaudible way of alerting the user of incoming messages or devices.

Although these alternative alerting modes are helpful, users often forget to change the alert mode before entering into a situation where a loud alert is disruptive, such as a meeting or a theater. It would be desirable for these devices to recognize that a significant number of similar devices are present and automatically change modes to a less disruptive mode of alerting the user of incoming messages or calls.

SUMMARY OF THE INVENTION

According to principles of the present invention, an object alerting device discovers nearby alerting devices, compares the nearby alerting devices to a condition, and sets the object alerting device to a quiet mode when the condition is met by the nearby alerting devices.

According to further principles of the present invention, the nearby alerting devices may be discovered by receiving identification information from the nearby alerting devices and analyzing the identification information to discover the nearby alerting devices. Additionally, the object alerting device may first broadcast a request for identification to the nearby alerting devices.

According to further principles of the present invention, the object alerting device discovers the nearby alerting devices within a range, such as the communication range of the object alerting device, a portion of the communication range of the object alerting device, or a fixed distance about the object alerting device. The condition may be a number of nearby alerting devices within a distance from the object alerting device.

According to further principles of the present invention, the object alerting device may set be set to a quiet mode by either reducing the alerting volume, enabling a vibration alert mode, or both reducing the alerting volume and enabling a vibration alert mode.

DETAILED DESCRIPTION OF THE INVENTION

Figure 1:
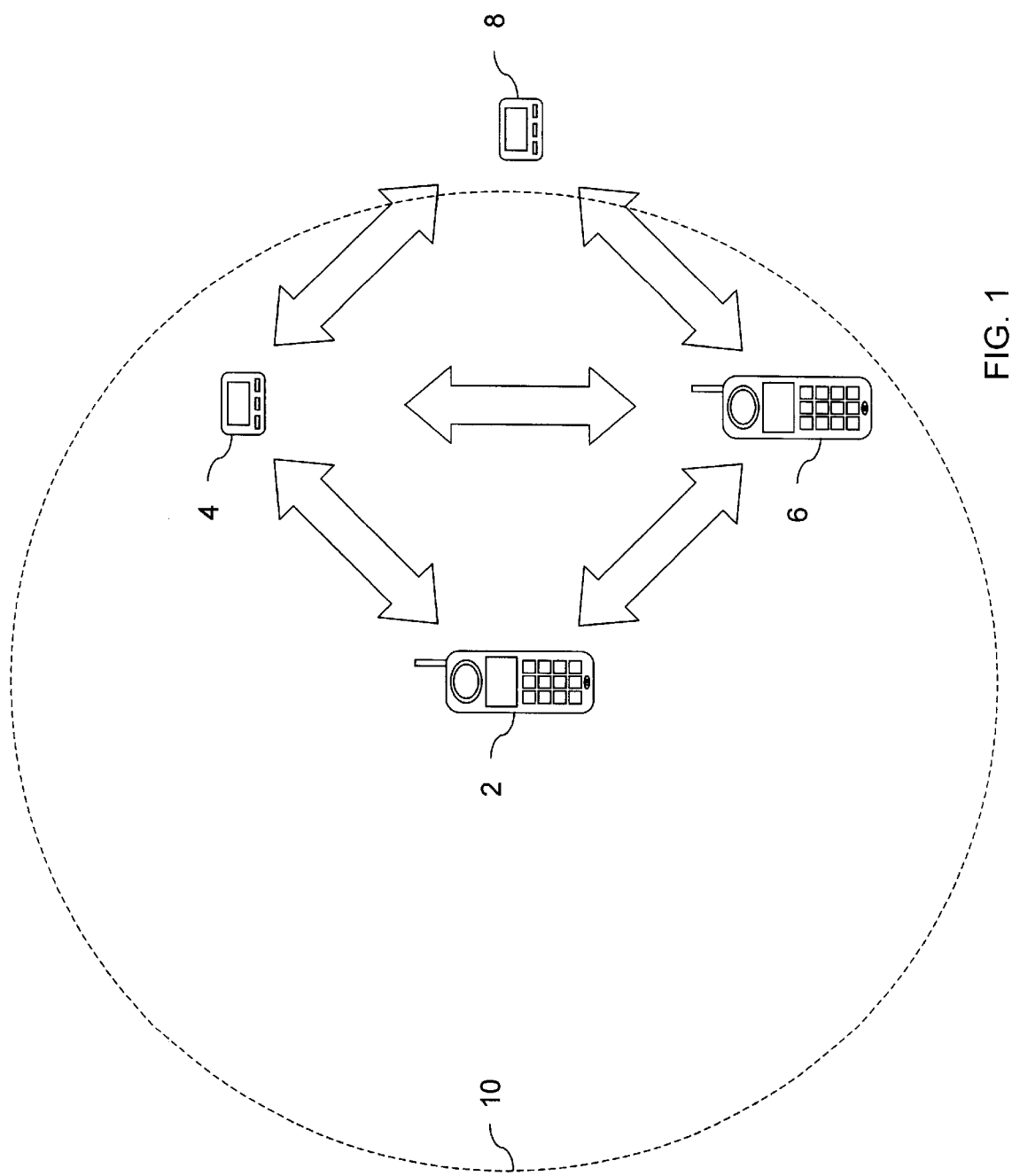
FIG. 1 is an illustration of alerting devices operating with the present invention.

Illustrated in FIG. 1 are four alerting devices 2, 4, 6, 8. Each alerting device 2,4,6,8 is a device that includes an alerting function. For example, telephones and pagers are each alerting devices since each alerts a user of an incoming message or call. It is expected, but not necessary, that alerting device 2,4,6,8 will include functions other than alerting which will often be the primary function of the device. For example, for pagers and telephones the conveyance of information is the primary function. Alerting the user of the incoming information is often not the primary function, but is helpful to a user.

In order to illustrate the operation of the present invention, one of the alerting devices is designated as an object alerting device 2, two of the alerting devices are designated as nearby alerting devices 4, 6, and one of the alerting devices is designated as a distant alerting device 8. Operation of the present invention will be illustrated from the perspective of object alerting device 2. Although, it is contemplated that each of the alerting devices 2, 4,6, 8 will include capabilities similar or identical to those described for object alerting device 2.

Centered upon object alerting device 2 is a range 10. Range 10 is a range about object alerting device 2 within which other alerting devices are nearby alerting devices 4, 6 and outside of which other alerting devices are distant alerting device 8. Range 10 is any area about object alerting device 2 and is definable in a number of ways. Range 10 need not be circular as illustrated. Range 10 may take any shape necessary or convenient. Range 10 may be user selectable or defined. by the environment in which object alerting device 2 is located. For example, range 10 may be a communication range of object alerting device 2, a portion of the communication range of the object alerting device 2, or a fixed distance about object alerting device 2. The communication range of object device 2 refers to the communication range of the hardware of the present invention rather than other hardware present in object alerting device 2.

Figure 2:
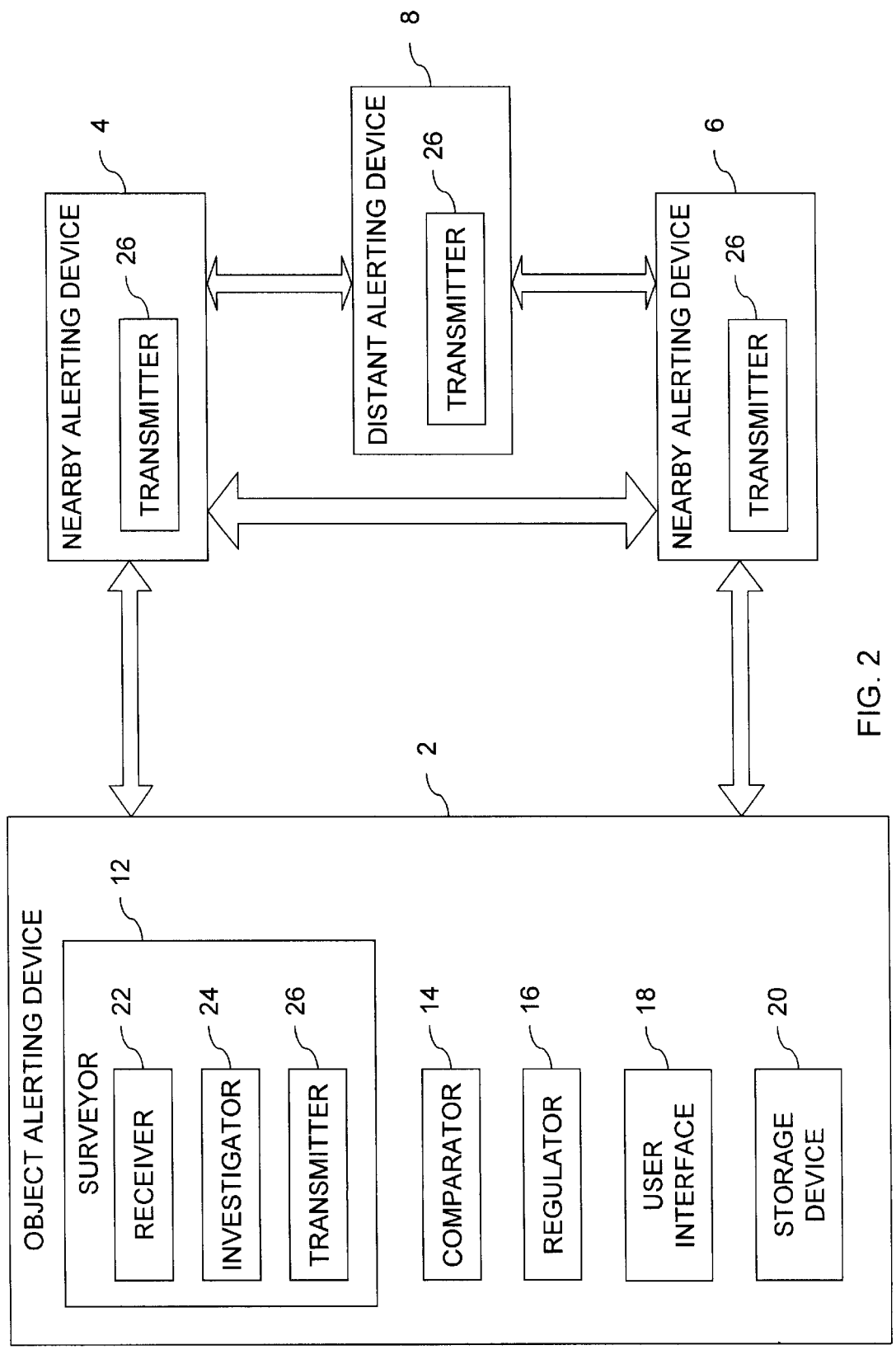
FIG. 2 is a block diagram representing one embodiment of the system of the present invention for quieting an object alerting device.

FIG. 2 shows, in block diagram form, the alerting device 2, 4, 6, 8 illustrated in FIG. 1. Object alerting device 2 includes, in any combination of hardware and executable code, surveyor 12, comparator 14, regulator 16, and optionally, user interface 18 and storage device 20.

Surveyor 1 2 is any combination of hardware and executable code configured to discover, within range 10, nearby alerting devices 4,6. In one embodiment, surveyor 12 includes receiver 22, investigator 24, and, optionally, transmitter 26. Receiver 22 is any combination of hardware and executable code configured to receive identification information from nearby alerting devices 4,6. Investigator 24 is any combination of hardware and executable code configured to analyze the identification information to discover nearby alerting devices 4,6. Transmitter 26 is any combination of hardware and executable code configured to broadcast a request for identification to nearby alerting devices 4,6. Transmitter 26 may also be configured to broadcast or transmit identification information to nearby alerting devices 4,6.

Comparator 14 is any combination of hardware and executable code configured to compare nearby alerting devices 4, 6 to a condition. An example of a condition includes a number of nearby alerting devices 4, 6 within a distance from the object alerting device. In a more detailed example, the condition is two or more nearby alerting devices 4,6 within range 10.

Regulator 16 is any combination of hardware and executable code configured to set the object alerting device to a quiet mode when the condition is met by nearby alerting devices. The quiet mode is any mode that is less disturbing than a normal audible mode. Examples of a quiet mode include a reduced volume audible alert mode and a vibrating alert mode.

User interface 18 is an interface allowing a user to interact with object alerting device 2 to make preference selections. For example, selections relating to range 10, the condition, and an alerting mode.

Storage device 20 is any device for storing data or executable code. Storage device 20 may also be a program storage device tangibly embodying a program, applet, or instructions executable by object alerting device 2 for performing the method steps of the present invention executable by object alerting device 2. Storage device 20 may be any type of storage media such as magnetic, optical, or electronic storage media. Although depicted as integral to object alerting device 2, storage device 20 is alternatively embodied separate from object alerting device 2 and accessible by object alerting device 2.

Nearby alerting devices 4, 6 and distant alerting device 8 also each include transmitter 26 for broadcasting or transmitting identification information.

Figure 3:
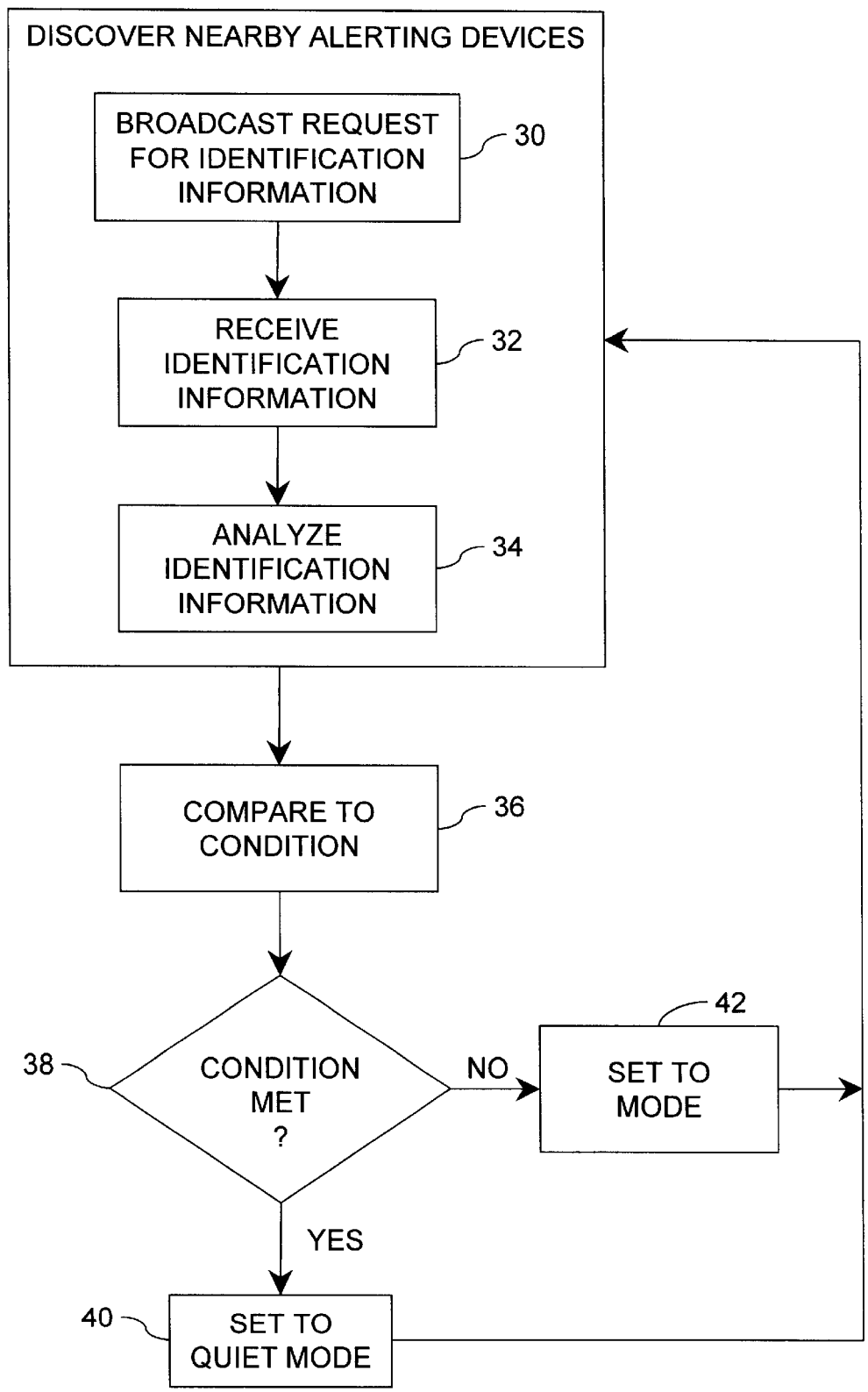
FIG. 3 is a flow chart illustrating one embodiment of the method of the present invention for quieting an object alerting device.

FIG. 3 is a flow chart representing steps of one embodiment of the present invention. Although the steps represented in FIG. 3 are presented in a specific order, the present invention encompasses variations in the order of steps. Furthermore, additional steps may be executed between the steps illustrated in FIG. 3 without departing from the scope of the present invention.

Nearby devices 4,6 are discovered 28. In one embodiment, nearby alerting devices 4, 6 are discovered 28 by receiving 32 identification information from nearby alerting devices 4,6 and analyzing 34 the identification. In an alternative embodiment, a request for information is first broadcast 30. Nearby alerting devices 4,6 reply to the request or information by transmitting or broadcasting the identification information. The identification information identifies nearby alerting devices 4,6 and allows object alerting device 2 to count the number of nearby alerting devices 4,6.

After nearby alerting devices 4, 6 are discovered 28, nearby alerting devices 4,6 are compared 36 to a condition. For example, the number of nearby alerting devices 4, 6 within a distance from object alerting device 2 is compared to a condition. If the condition is met 38, object alerting device 2 is set to a quiet mode. If the condition is not met 38, the object alerting device 2 is, optionally, set to a mode. An example of a mode includes normal audible alerting mode.

In one embodiment, the process is either continually or periodically repeated to ensure that object alerting device 2 is set to the most desirable alerting mode.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for quieting an object alerting device, the method comprising:

(a) discovering, within a range, nearby alerting devices;

(b) comparing the nearby alerting devices to a condition; and, (c) setting the object alerting device to a quiet mode when the condition is met by the nearby alerting devices.

2. The method of claim 1 wherein discovering the nearby alerting devices includes:

(a) receiving identification information from the nearby alerting devices; and, (b) analyzing the identification information to discover the nearby alerting devices.

3. The method of claim 2 wherein discovering the nearby alerting devices further includes the object alerting device broadcasting a request for identification to the nearby alerting devices.

4. The method of claim 1 wherein the range is selected from a communication range of the object alerting device, a portion of the communication range of the object alerting device, and a fixed distance about the object alerting device.

5. The method of claim 1 wherein the condition includes a number of nearby alerting devices within a distance from the object alerting device.

6. The method of claim 1 wherein setting the object alerting device to a quiet mode includes reducing the alerting volume of the object alerting device.

7. The method of claim 1 wherein setting the object alerting device to a quiet mode includes enabling a vibration alert mode on the object alerting device.

8. A system for quieting an object alerting device, the system comprising:

(a) a surveyor configured to discover, within a range, nearby alerting devices;

(b) a comparator configured to compare the nearby alerting devices to a condition; and, (c) a regulator configured to set the object alerting device to a quiet mode when the condition is met by the nearby alerting devices.

9. The system of claim 8 wherein the surveyor includes:

(a) a receiver configured to receive identification information from the nearby alerting devices; and, (b) an investigator configured to analyze the identification information to discover the nearby alerting devices.

10. The system of claim 9 wherein the surveyor further includes a transmitter configured to broadcast a request for identification to the nearby alerting devices.

11. The system of claim 8 wherein the range is selected from a communication range of the object alerting device, a portion of the communication range of the object alerting device, and a fixed distance about the object alerting device.

12. The system of claim 8 wherein the condition includes a number of nearby alerting devices within a distance from the object alerting device.

13. The system of claim 8 wherein the quiet mode is selected from the group consisting of a reduced volume audible alert mode and a vibrating alert mode.

14. A program storage device readable by a computer, tangibly embodying a program, applet or instructions executable by the computer to perform method steps for quieting an object alerting device, the method steps comprising:

(a) discovering, within a range, nearby alerting devices;

(b) comparing the nearby alerting devices to a condition; and, (c) setting the object alerting device to a quiet mode when the condition is met by the nearby alerting devices.

15. The program storage device of claim 14 wherein the method step of discovering the nearby alerting devices includes:

(a) receiving identification information from the nearby alerting devices; and, (b) analyzing the identification information to discover the nearby alerting devices.

16. The program storage device of claim 14 wherein the method step of discovering the nearby alerting devices further includes the object alerting device broadcasting a request for identification to the nearby alerting devices.

17. The program storage device of claim 14 wherein the range is selected from a communication range of the object alerting device, a portion of the communication range of the object alerting device, and a fixed distance about the object alerting device.

18. The program storage device of claim 14 wherein the condition includes a number of nearby alerting devices within a distance from the object alerting device.

19. The program storage device of claim 14 wherein the method step of setting the object alerting device to a quiet mode includes reducing the alerting volume of the object alerting device.

20. The program storage device of claim 14 wherein the method step of setting the object alerting device to a quiet mode includes enabling a vibration alert mode on the object alerting device.

* * * * *